(12) United States Patent
Webb

(10) Patent No.: US 9,016,190 B2
(45) Date of Patent: Apr. 28, 2015

(54) TURKEY FRYER WITH COMPLETE SPLATTER PROTECTION

(76) Inventor: James Webb, New Lexington, OH (US)

( * ) Notice: Subject to any disclaimer, the term of this patent is extended or adjusted under 35 U.S.C. 154(b) by 209 days.

(21) Appl. No.: 13/552,732

(22) Filed: Jul. 19, 2012

(65) Prior Publication Data

US 2014/0020569 A1    Jan. 23, 2014

(51) Int. Cl.
*A47J 37/12* (2006.01)
*A47J 43/18* (2006.01)

(52) U.S. Cl.
CPC .................................. *A47J 37/1204* (2013.01)

(58) Field of Classification Search
CPC  A47J 37/1204; A47J 37/1209; A47J 37/1219
USPC ................................ 99/418, 421 A
See application file for complete search history.

(56) References Cited

U.S. PATENT DOCUMENTS

| 53,421 | A | | 3/1866 | Dembois | |
|---|---|---|---|---|---|
| 4,189,993 | A | * | 2/1980 | Kaufman | 99/403 |
| 5,542,347 | A | | 8/1996 | Joseph | |
| 5,896,810 | A | * | 4/1999 | Barbour | 99/415 |
| 7,044,049 | B2 | | 5/2006 | Johnston, Sr. et al. | |
| 7,316,180 | B2 | * | 1/2008 | Williams | 99/403 |
| 8,109,201 | B2 | * | 2/2012 | Schandel et al. | 99/340 |
| 8,733,235 | B1 | * | 5/2014 | Chipman | 99/339 |
| 2003/0003209 | A1 | * | 1/2003 | Rigney | 426/438 |
| 2007/0108217 | A1 | | 5/2007 | Williams | |
| 2008/0073356 | A1 | | 3/2008 | Sulosky | |
| 2008/0121117 | A1 | * | 5/2008 | Best | 99/339 |
| 2010/0288138 | A1 | | 11/2010 | Fiorino et al. | |

* cited by examiner

*Primary Examiner* — Tu B Hoang
*Assistant Examiner* — Alba Rosario-Aponte
(74) *Attorney, Agent, or Firm* — Frank H. Foster; Kremblas & Foster

(57) ABSTRACT

A fryer for deep frying a turkey has an outer cooking pot for containing hot oil. A splatter sleeve is telescopically slidable into the pot, the sleeve having a surrounding side wall, an open top surrounded by a top sleeve rim and an open bottom surrounded by a bottom sleeve rim. A lid is sealingly seatable upon the top sleeve rim and has a lid hole. A lid latch latches the lid to the top sleeve rim. A turkey support has a turkey support base, extends upwardly from the base to a handle top end and is insertable through the hole in the lid. When these components and a turkey are assembled, suspended from the handle and lowered into hot cooking oil, the sleeve is sufficiently long that it enters the oil before the turkey thereby assuring a complete splatter barrier.

8 Claims, 4 Drawing Sheets

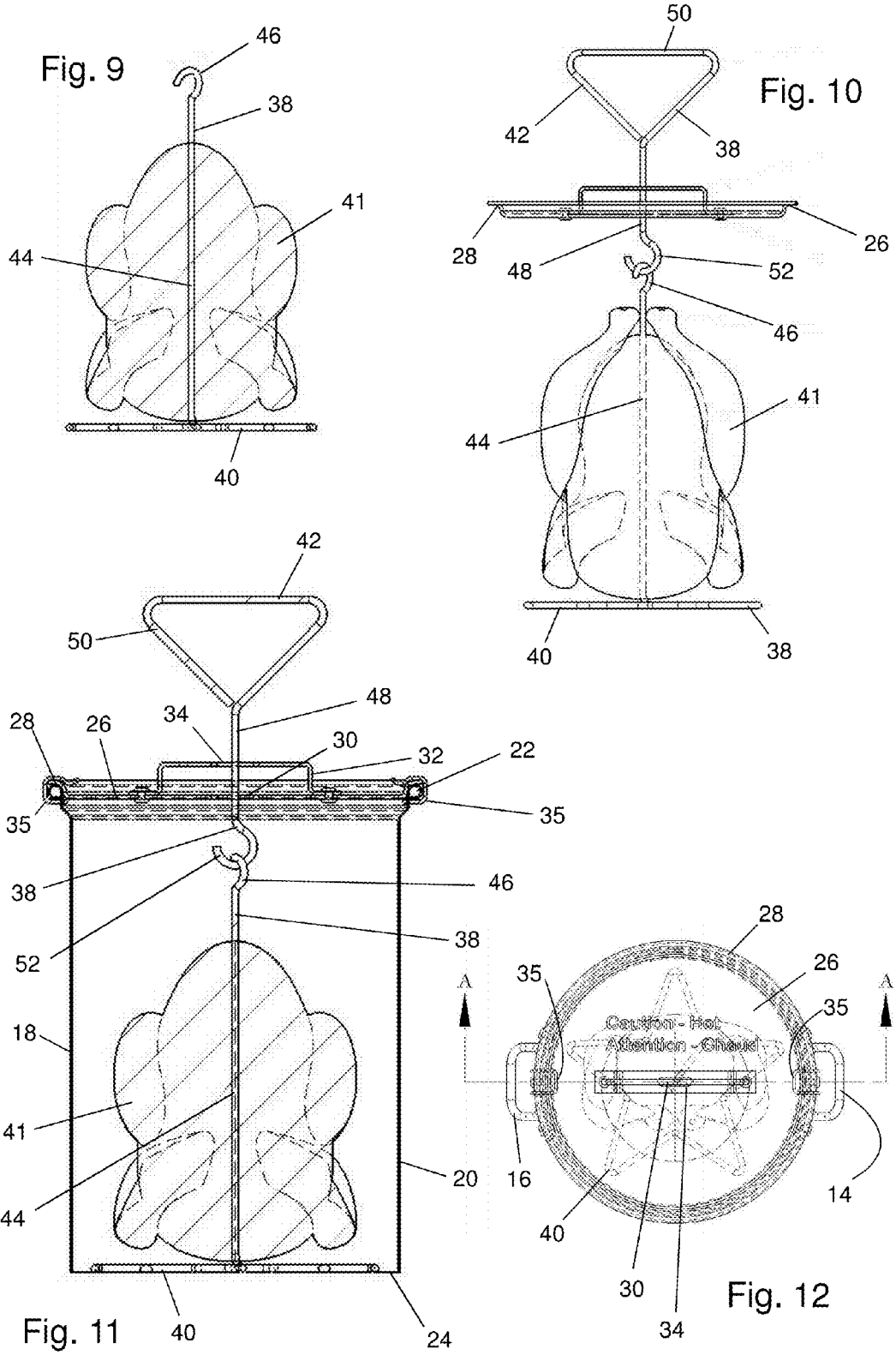

TURKEY FRYER WITH COMPLETE SPLATTER PROTECTION

BACKGROUND OF THE INVENTION

This invention is directed generally to food cooking implements and more particularly is directed to a combination of structures for deep frying a turkey or other foodstuffs with improved safety. The structures of the invention provide a complete protective barrier that prevents splatter, which is initiated by immersion of the foodstuff into hot cooking oil, from being projected in any direction beyond the fryer.

Over the past several years deep frying a turkey has become an increasingly popular avocation because of the enhanced flavor, moistness, texture and attractive appearance of a deep fried turkey. For frying a turkey, a cooking pot that is large enough to contain a turkey is filled with a cooking oil to a level that is sufficient to surround and cover the turkey. The oil is heated to a temperature on the order of 325° F. to 350° F. and then the turkey is lowered into the pot and submerged in the hot oil.

As with many desirable activities, deep frying a turkey in this manner is accompanied by safety hazards that create risks of personal injury and property damage. Two of the principal risks that are inherent in deep frying a turkey are boil over and splatter. Both of these problems are caused by the presence of water on the surface and within the outer layer of a fresh or frozen and thawed turkey. Because the oil is heated to a temperature that exceeds that boiling temperature of water, when the turkey is initially lowered into the hot cooking oil that water is very suddenly heated to its boiling temperature. Some of that water is quickly vaporized to steam immediately on contact with the hot oil so the water rapidly expands in an explosive manner.

Boil over occurs when the exploding water generates, beneath the surface of the oil, a foam of oil mixed with steam. The oil foam rises upwardly over the rim of the pot and can run down the outside of the pot into a flame below the pot which can cause the oil to ignite and start a fire. The oil foam can also damage or destroy an underlying floor or other support surface on which a pot support and burner rest. Boil over is reduced or prevented by lowering the turkey sufficiently slowly in the hot oil combined with not overfilling the pot with oil but instead leaving an adequate distance from the top surface of the oil to the rim of the pot. The principal purpose of this invention is not to reduce boil over, although the preferred embodiment oft the invention is of some assistance in restraining or limiting boil over.

Splatter is caused by the water on and in the surface of a turkey explosively vaporizing near the surface of the oil. When the water violently vaporizes near the surface of the oil, some of the vaporizing water projects hot oil upwardly and outwardly from the pot. That hot liquid can be projected against the user and cause burn injuries. The projected oil can also strike surrounding objects and furnishings damaging them and possibly igniting them. The purpose of this invention is to eliminate all such splatter when the invention is constructed and used properly.

The prior art discloses devices intended to prevent boil over, typically by providing an annular lip or tray surrounding the upper part of the pot to catch boiled over oil. Others have provided shields against some of the splatter of cooking oil from a frying implement. But no prior art has been seen that is capable of entirely surrounding and completely enclosing the turkey beginning before the turkey contacts the cooking oil, continuing without interruption as the turkey is lowered into the oil and remaining for as long as desired after the turkey is fully immersed in the oil. All prior art leaves some opening through which splatter can project at some angle out of the pot as the turkey is initially lowered into the hot oil.

Therefore, it is an object and feature of the invention to provide a turkey fryer that entirely encloses an uncooked turkey with a protective barrier that catches splatter in all directions so that no hot oil can splatter and be projected from a turkey fryer embodying the present invention.

BRIEF SUMMARY OF THE INVENTION

The invention is a fryer for deep frying a turkey or other foodstuff. A conventional outer cooking pot contains hot cooking oil and has a top cooking pot rim. A splatter sleeve is slidable into the pot and has a surrounding side wall, an open top surrounded by a top sleeve rim and an open bottom surrounded by a bottom sleeve rim. A lid is sealingly seatable upon the top sleeve rim and has a lid hole preferably at its center. At least one lid latch is capable of latching the lid to the top sleeve rim. A turkey support has a turkey support base at a lower end and a hand grippable top end. The turkey support extends upwardly from its base and is insertable through the hole in the lid. With a turkey resting on the turkey support base, the splatter sleeve latched to the lid and the turkey support extending through the lid hole and suspended from its top end, the splatter sleeve extends downwardly lower than the turkey so that, as the turkey is lowered into the hot cooking oil, the bottom sleeve rim contacts the hot oil before the turkey contacts the oil. That assures that the turkey is entirely enveloped by a protective barrier beginning before the turkey first contacts the hot cooking oil and splattering begins and continuing thereafter.

BRIEF DESCRIPTION OF THE SEVERAL VIEWS OF THE DRAWINGS

FIG. 9 is a view in vertical section of a turkey mounted on the turkey support segment of the turkey support of the preferred embodiment of the invention taken along the line A-A of FIG. 12.

FIG. 10 is a view in vertical section of the assembled turkey support, turkey and lid of the preferred embodiment of the invention taken along the line A-A of FIG. 12.

FIG. 11 is a view in vertical section of the assembled components illustrated in FIG. 10 along with the splatter shield of the preferred embodiment of the invention.

FIG. 12 is a top view of the assembled components of the preferred embodiment of the invention illustrated in FIG. 1.

Figure 1:
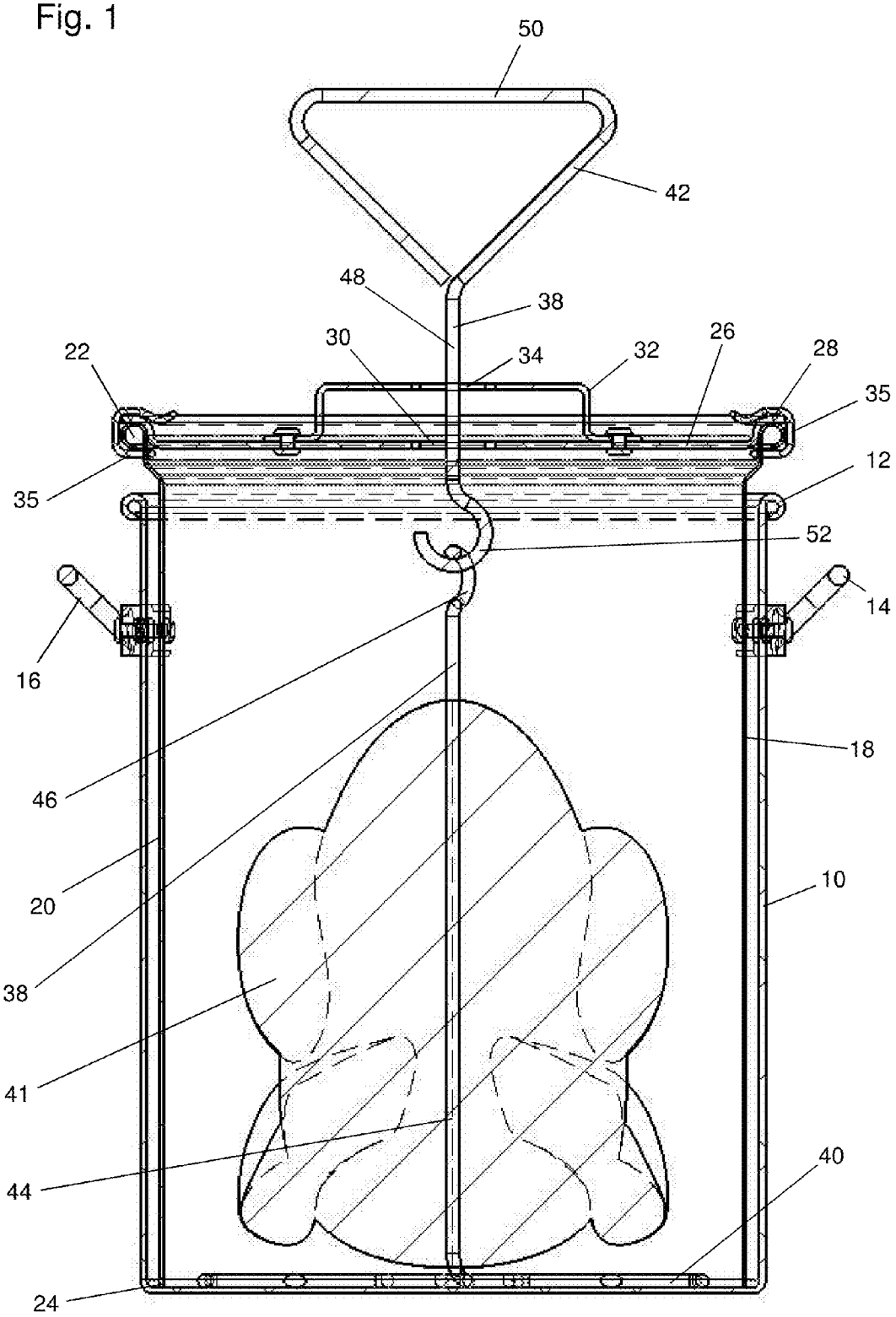
FIG. 1 is a view in vertical and axial section of the components of the preferred embodiment of the invention that are assembled in the turkey cooking configuration, the section being taken along the line A-A of FIG. 12.
Figure 2:
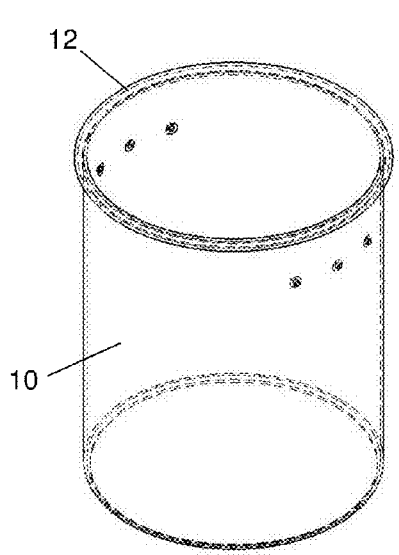
FIG. 2 is a view in perspective of the fryer pot component of the preferred embodiment of the invention with its handles uninstalled.
Figure 3:
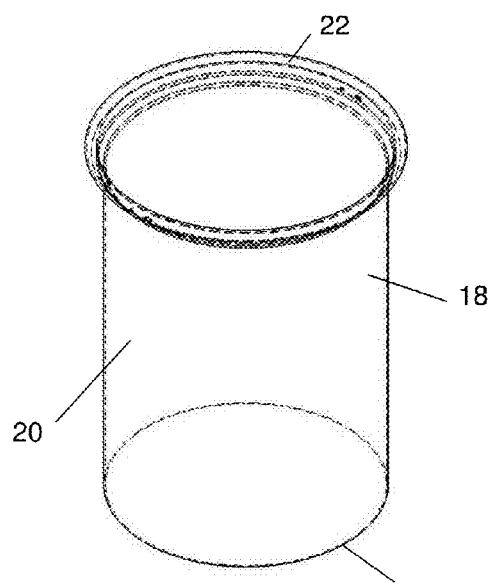
FIG. 3 is a view in perspective of the splatter sleeve component of the preferred embodiment of the invention.
Figure 4:
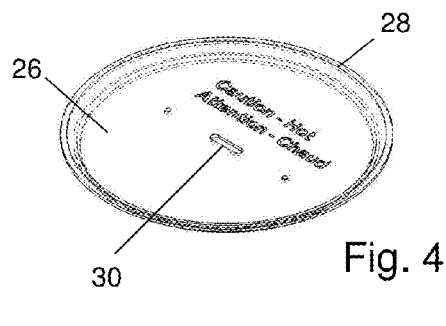
FIG. 4 is a view in perspective of the lid component of the preferred embodiment of the invention.
Figure 5:
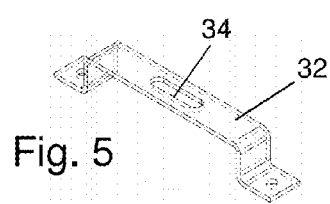
FIG. 5 is a view in perspective of the lid handle component of the preferred embodiment of the invention.
Figure 6:
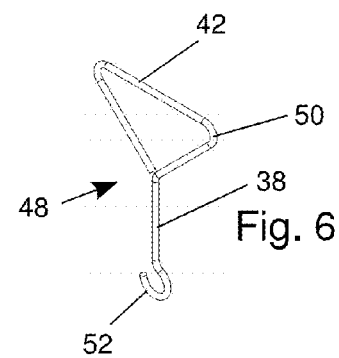
FIG. 6 is a view in perspective of the handle segment of the turkey support component of the preferred embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Each of the component parts of the preferred embodiment of the invention that is illustrated in the drawings will be described with simultaneous reference to all the figures in which each component part appears. Each part is identified by its identical reference numeral in all figures in which the part appears.

Referring to the Figures, a fryer for deep frying a turkey or other foodstuff and embodying the invention has an outer cooking pot 10 for containing hot cooking oil. The pot 10 has a top cooking pot rim 12 around its open top. The pot 10 is a conventional cooking pot as well known in the prior art and has handles 14 and 16 on opposite sides. Preferably the pot 10 is cylindrical and has a height in the direction of its central axis and a diameter perpendicular to that axis that desirably have subsequently described dimensional relationships with other components of the turkey fryer.

A tubular and preferably cylindrical splatter sleeve 18 is slidable into the pot 10. The splatter sleeve 18 has a surrounding side wall 20, an open top surrounded by a top sleeve rim 22 and an open bottom surrounded by a bottom sleeve rim 24. The top sleeve rim 22 is formed as an outwardly flared flange for receipt of a lid. Although the splatter sleeve 18 is preferably cylindrical, it could alternatively be formed with a cross-sectional shape that is rectangular, oval or other geometrical shape. The splatter sleeve could be somewhat tapered in a frusto-conical or frusto-pyramidal shape, although no advantage is seen in doing so. Most preferably the splatter sleeve 18 has the same cross-sectional geometric shape as the pot 10 and is slightly smaller in diameter or width so that it is telescopically slidable into the pot 10 for sealingly minimizing the clearance between the sleeve 18 and the pot 10. The splatter sleeve 18 should leave a clearance between the sleeve 18 and the pot 10 that is only sufficient to prevent any friction between them from resisting sliding of the sleeve 18 into the pot 10.

A lid 26 is sealingly seatable upon the splatter sleeve 18. In particular, the lid 26 has an outwardly flared flange 28 that mates with and sealingly engages the top sleeve rim 22 of the splatter sleeve 18. The outwardly flared flange of the top splatter sleeve rim 22 is positioned radially outwardly from the central axis of the sleeve 18 at the same radius as the cooking pot rim 12. This allows the lid 26 to be sealingly seatable alternatively on the flared flange of the splatter sleeve 18 or on the rim 12 of the pot 10. The lid 26 has a lid hole 30 that preferably is elongated and positioned centrally through the lid 26. A lid handle 32 is attached to the lid 26 near its center and on its upper surface. The lid handle 32 also has an elongated handle hole 34 that is axially aligned with the lid hole 30.

Figure 8:
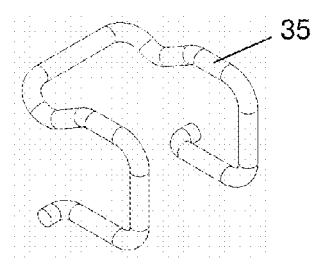
FIG. 8 is a view in perspective of the preferred lid latch component of the preferred embodiment of the invention.
Figure 7:
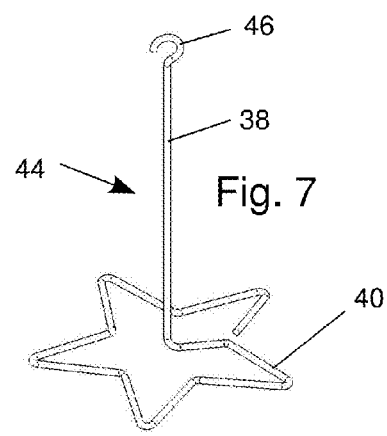
FIG. 7 is a view in perspective of the turkey support segment of the turkey support component of the preferred embodiment of the invention.
Figure 13:
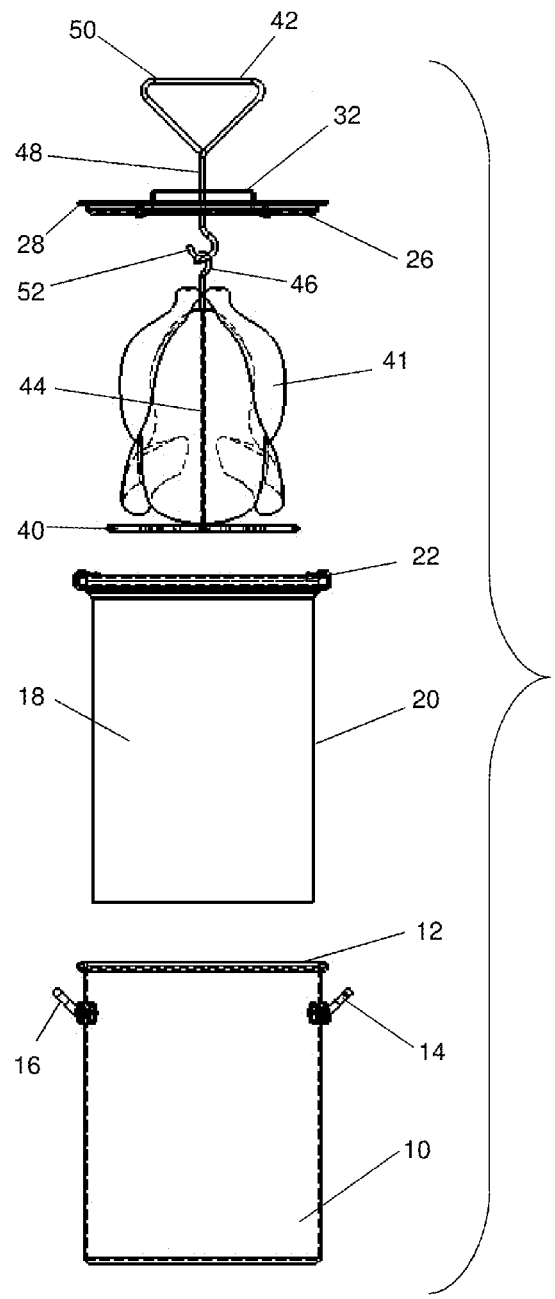
FIG. 13 is an exploded view in vertical section of the preferred embodiment of the invention and taken along the line A-A of FIG. 12.
Figure 14:
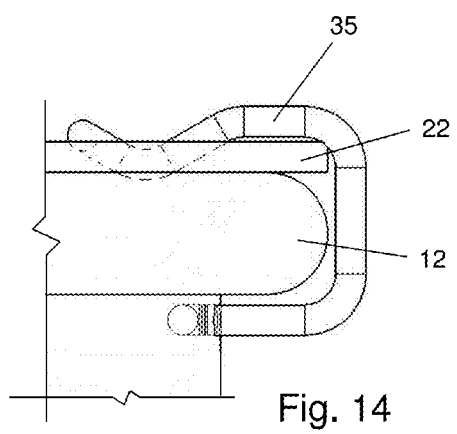
FIG. 14 is a detailed view of a segment of the preferred embodiment of the invention and illustrating the attachment of the preferred lid latch.

In order to allow the lid 26 to be latched or clamped alternatively to the outwardly flared flange of the top splatter sleeve rim 22 or to the rim 12 of the pot 10, there is a lid latch 35. Preferably there are at least two lid latches which clamp the lid on either rim at positions on opposite sides of the lid. The preferred lid latches 35 are clips that are separable from the lid, the splatter sleeve and the pot to permit the clips to alternatively latch the lid 26 to the sleeve 18 or latch the lid 26 to the pot 10. As most visible in FIGS. 8, 12 and 14, the lid latch 35 is a bent metal wire or rod, preferably spring steel, that extends from beneath the pot rim 12 outwardly around the pot rim 12 and around the lid flange 22, then turns inwardly over the top of the lid flange 22 and downwardly radially inwardly of the lid flange 22. Of course each preferred lid latch clip 35 is contoured and sized so that the lid latch clip 35 is slightly resiliently deformed as it is forced radially inwardly to its clamping position or pushed radially outwardly for release of the lid. The prior art has shown several other types of latches that are suitable for releasably attaching the lid 26 to the pot 10 or the splatter sleeve 18. A lid latch, such as a conventional, hinged, two-part toggle type of latch, could alternatively be permanently attached to the lid. Latches could also be attached to the pot 10 and the sleeve 18. The most important feature of the latch is that it be able to hold the lid 26 securely on the splatter sleeve 18 while the turkey is being lowered into the hot cooking oil within the pot 10 and yet be manually releasable.

A turkey support 38 has a turkey support base 40 at a lower end, on which a turkey 41 can rest, and extends upwardly from its base 40. The turkey support 38 is insertable through the holes 30 and 34 in the lid 26 and in the lid handle 32 and has a hand grippable top end 42. The turkey support could be a simple chain or wire with a turkey support platform at its lower end. However, preferably the turkey support 38 comprises two component segments and preferably each is constructed of bent aluminum or stainless steel bar stock.

The preferred and illustrated turkey support 38 has a lower turkey support segment 44 that is formed from a bent rod of bar stock. The turkey support base 40 is formed at its lower end by bending the rod into a grille at its lower end such as in the star shape illustrated. The lower turkey support segment 44 extends upwardly from the support base 40 to a hook 46 formed at its upper end. The second component of the turkey support 38 is a handle segment 48 preferably also formed from an elongated rod bent to form a manually grippable handle 50 at its upper end, which is preferably formed as a loop. A hook 52 is formed at the lower end of the handle segment 48 for engaging the hook 46 of the turkey support segment 44. At least one and preferably both of the hooks 46 and 52 are smaller than both of the elongated holes 30 and 34 in the lid 26 and lid handle 32 so that the hooks 46 and 52 can be inserted through the aligned elongated holes 30 and 34.

The use and operation of embodiments of the invention begin with mounting the turkey on the lower turkey support segment 44 by inserting the hook 46 through the center of the turkey until the turkey is supported on the support base 40 and the hook 46 protrudes above the turkey. Cooking oil must be poured into the pot 10 to a level that will cover the top of the turkey after the turkey is submerged in the oil but will not be much higher than the top of the turkey. That level can be determined, before pouring in the oil, by positioning the turkey in the pot 10 while mounted on the lower turkey support segment 44 and then pouring in enough water to bring the water level above the turkey. Removal of the turkey and the lower turkey support segment 44 from the pot 10 allows the top surface of the water to lower to the level to which the cooking oil should be poured into the pot 10 before submerging the turkey. The water is removed and oil is then poured into the pot 10 to that level and heated to cooking temperature.

The hook 52 of the handle segment 48 is then inserted through the aligned holes 30 and 34 in the lid 26 and lid handle 32 and hooked through the hook 46 of the lower turkey support segment 44. The user then grasps the manually grippable handle 50 and lifts the entire assembly of the turkey, the connected segments of the turkey support 38 and the lid 26 and lowers that entire assembly into the upper end of the splatter sleeve 18 until the lid seats upon the flange 22 of the splatter sleeve 18. The lid 26 is then latched to the flange 22 of the splatter sleeve 18 by forcing the clips radially inwardly around their mating flanges.

In that configuration, the assembled turkey 41, turkey support 38, lid 26 and splatter sleeve 18 are raised as a unit by lifting on the manually grippable handle 50. When this assembly is lifted, the turkey is entirely surrounded on its sides by the splatter sleeve 18 and on its top by the lid 26. The assembly is then slowly lowered into the hot cooking oil within the pot 10. As shown in the drawings, the bottom rim 24 extends lower than the turkey so that the splatter sleeve 18 enters the hot cooking oil before the turkey and therefore before the water on and in the turkey can be heated by the hot oil and cause splattering. As the assembly is progressively lowered further into the oil, the splattering that normally occurs is confined to within the splatter sleeve 18 by the wall of the splatter sleeve 18 on its sides, by the lid 26 at the top and by the oil at the bottom of the splatter sleeve 18. Consequently, the turkey is entirely encased by a protective barrier against splatter being projected in any direction.

After the turbulence that is caused by the rapidly vaporized water has subsided, the user has two options. The user can simply wait for the cooking of the turkey to be completed leaving the assembly in place. Alternatively, the user can unhook the hook 52 from the hook 46 and lift the handle segment 48, the lid 26 and the splatter sleeve 18 from the hot oil leaving the turkey supported on the lower turkey support segment 44 in the oil while cooking continues. The lid 26 can be unlatched and disassembled from the splatter sleeve 18, and the handle segment 48 and positioned directly on the rim 12 of the pot 10 where it can be latched if desired for resisting any subsequent boil over or splatter of the cooking oil. The handle segment 48 of the turkey support 38 can then be allowed to cool for later use. When cooking is completed, the lid 26 can be removed from the pot 10 and the hook 52 of the handle segment 48 can be inserted a short distance into the oil and hooked on the hook 46 of the lower turkey support segment 44 and used to lift the finished turkey out of the oil.

In order to optimize the safety and convenience features available with the present invention, it is desirable to have some particular dimensional relationships between some of it components. As described above, it is highly desirable that the bottom of the splatter sleeve contacts the cooking oil in the pot before the turkey contacts the cooking oil. That assures that the turkey is entirely encased by a protective barrier when splattering begins. For that to occur, the bottom splatter sleeve rim should extend downwardly lower than the turkey, and preferably lower than the support base to provide a safety margin, when a turkey is resting on the turkey support base, the splatter sleeve is latched to the lid and the turkey support extends through the holes and is suspended from its top end, such as by a grippable handle. That relationship assures that the bottom sleeve rim contacts the cooking oil in the pot before the turkey and its water content contacts the cooking oil.

The actual height of the splatter sleeve 18 is dependent upon the length and the configuration of the turkey support. With the preferred turkey support 38 that is illustrated in the drawings, when the assembled turkey, turkey support, lid and splatter shield are suspended from the handle 50, the lid will set upon the end of the hook 52, which is well above the turkey 41. Therefore, the splatter sleeve should extend more than the sum of the distance of the lid above the turkey plus the height of the turkey. However, if a simple chain is used as the turkey support and the chain is free to pass longitudinally through the hole in the lid, the lid will set directly upon the top of the turkey 41. Consequently, depending upon the configuration of the turkey support, the splatter sleeve should have a height from its top rim to its bottom rim that exceeds the height of the turkey by at least the distance above the turkey at which a structure of the turkey support also supports the lid.

Of course, even if the bottom rim of the splatter sleeve is slightly higher than the bottom of the turkey so that the turkey would enter the hot oil before the sleeve, if the height of the sleeve above the oil is small when splatter begins, splatter would not be projected sufficiently in an upward direction out of the pot but instead would strike the interior sidewall of the pot. If the preferred clips 35 are used, the height of the splatter sleeve 18 should be higher than the height of the pot 10 by an amount that is at least equal to the thickness of the clips 35. That provides a clearance between the upper rim 12 of the pot 10 and the rim 22 of the splatter shield 18 to allow the clips to be inserted and latch the lid 26 to the splatter shield 18.

It is also desirable that the hook 46 at the top of the lower turkey support segment 44 be located sufficiently above the bottom of the pot 10 that it either protrudes above the surface of the cooking oil or, if submerged, is at least near that surface so that it is readily visible. That feature places the hook 46 where it is visible to facilitate hooking the hook 52 around the hook 46 for lifting the turkey from the oil after cooking is completed. However, the hook 46 must be low enough that it does not prevent the lid 26 from seating on the rim of either the splatter shield 18 or the pot 10. For that purpose the turkey support segment 38 preferably has a length that is less than the height of the pot but is greater than 90% of the height of the pot.

Those skilled in the art will recognize that the invention is not limited to cooking a turkey but can be used to cook other foodstuffs such as chickens or seafood. The word "turkey" is used because that is the most popular foodstuff for a fryer of this type and therefore the word turkey is used to indicate any deep friable foodstuff.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A fryer for deep frying a turkey or other foodstuff and comprising:
    (a) an outer cooking pot for containing hot oil and having a top cooking pot rim;
    (b) a splatter sleeve that is slidable into the pot, the sleeve having a surrounding side wall, an open top surrounded by a top splatter sleeve rim and an open bottom surrounded by a bottom sleeve rim;

(c) a lid that is sealingly seatable upon the top splatter sleeve rim, the lid having a lid hole;

(d) at least one manually releasable lid latch attached to the underside of the top splatter sleeve rim for removably latching the lid rim to the top splatter sleeve rim when said splatter sleeve is being lowered into hot cooking oil within the pot; and (e) a turkey support having a turkey support base at a lower end and extending upwardly from its base, the turkey support insertable through the hole in the lid and having a hand grippable top end;

wherein, with a turkey resting on the turkey support base, the splatter sleeve latched to the lid and the turkey support extending through the hole and suspended from its top end, the bottom sleeve rim is lower than the turkey support base so that, in use, the bottom sleeve rim contacts a cooking oil in the pot before the turkey contacts the cooking oil.

2. A turkey fryer in accordance with claim 1, wherein the lid hole is elongated and positioned centrally through the lid, there are at least two of said lid latches, the splatter sleeve has a height in its axial direction that is greater that the height of the pot in its axial direction and the turkey fryer more particularly comprises:

(a) a lid handle attached centrally on the lid and having an elongated handle hole axially aligned with the lid hole;

(b) the turkey support comprising at least two component segments comprising (i) a turkey support segment including the support base at its lower end and extending upwardly from the support base to a hook at its upper end;

(ii) a handle segment having an elongated rod with a manually grippable handle at an upper end and a hook at its lower end for engaging the hook of the turkey support segment; and (iii) wherein at least one of the hooks is smaller than both of the elongated holes so that it can be inserted through the elongated holes.

3. A turkey fryer in accordance with claim 2 wherein, with a turkey resting on the turkey support base, the splatter sleeve latched to the lid, the turkey support extending through the holes and suspended from its manually grippable handle and the lid resting on the hook of the handle segment, the sleeve extends farther downwardly than the turkey support base so that the bottom sleeve rim is lower than the turkey support base so that, in use, the bottom sleeve rim contacts a cooking oil in the pot before the turkey contacts the cooking oil.

4. A turkey fryer in accordance with claim 3 wherein the pot and the splatter sleeve are cylindrical and the splatter sleeve has a smaller diameter than the pot and is telescopically slidable into the pot for sealingly minimizing the clearance between the sleeve and the pot.

5. A turkey fryer in accordance with claim 4 wherein the top splatter sleeve rim is formed as an outwardly flared flange and the lid is formed with a mating outwardly flared flange for sealingly engaging the top splatter sleeve rim, the lid being sealingly seatable alternatively on the flared flange of the splatter sleeve or on the rim of the pot.

6. A turkey fryer in accordance with claim 5 wherein the latches are clips that are separable from the lid, the splatter sleeve and the pot to permit the clips to alternatively latch the lid to the sleeve or latch the lid to the pot.

7. A turkey fryer in accordance with claim 6 wherein the turkey support segment has a length that is less than the height of the pot but is greater than 90% of the height of the pot so that in its operable position during turkey cooking the hook of the turkey support segment is near or protruding above the hot oil and visible for connection to the hook of the handle segment.

8. A turkey fryer in accordance with claim 7 wherein the turkey support segment is bent rod that is shaped into a turkey support grille and the handle segment is a bent rod having a loop as its manually grippable handle.

\* \* \* \* \*